United States Patent [19]

Neidhardt

[11] 4,025,684

[45] May 24, 1977

[54] TUBULAR FABRIC COATED WITH PLASTICS OR SYNTHETIC RUBBERS

[76] Inventor: Helmut Neidhardt, Kurfurstenstrasse 19, 6450 Hanau, Germany

[22] Filed: May 27, 1975

[21] Appl. No.: 580,829

Related U.S. Application Data

[63] Continuation of Ser. No. 282,775, Aug. 22, 1972, abandoned.

[30] Foreign Application Priority Data

Sept. 2, 1971 Germany .......................... 2143982

[52] U.S. Cl. .................... 428/257; 428/35; 428/258; 428/259; 139/387 R; 139/410; 139/390
[51] Int. Cl.² ................ D03D 3/02; D03D 11/00
[58] Field of Search ........... 139/384 R, 387 R–390, 139/408, 409, 410, 20; 428/257, 258, 259, 35; 28/76 T; 138/123–125

[56] References Cited

UNITED STATES PATENTS

| 2,435,543 | 2/1948 | Johnson et al. ............... 28/76 T |
| 2,657,716 | 11/1953 | Ford .......................... 139/410 |
| 2,848,018 | 8/1958 | Neisler, Jr. ................... 139/410 |
| 3,008,213 | 11/1961 | Foster et al. ............. 139/410 X |
| 3,008,214 | 11/1961 | Foster et al. .............. 139/384 R |
| 3,205,106 | 9/1965 | Cross ...................... 139/410 UX |
| 3,602,964 | 9/1971 | Currier et al. .................. 28/76 T |

FOREIGN PATENTS OR APPLICATIONS

| 688,290 | 3/1965 | Italy ................................. 139/410 |
| 420,786 | 12/1934 | United Kingdom ........... 139/387 R |
| 10,255 | 1914 | United Kingdom ............... 28/76 T |

Primary Examiner—James Kee Chi
Attorney, Agent, or Firm—Cushman, Darby & Cushman

[57] ABSTRACT

The disclosure embraces an inflatable flat tubular fabric which is coated on its outside surfaces with synthetic rubber or plastic and is constructed by weaving the fabric in tubular form with basic threads having a given tensile strength with the two layers of the fabric being joined together by auxiliary threads which have a substantially lower tensile strength than the basic threads so that, when the fabric is inflated, the auxiliary threads will be broken to permit expansion of the fabric to its full volume capacity.

8 Claims, 9 Drawing Figures

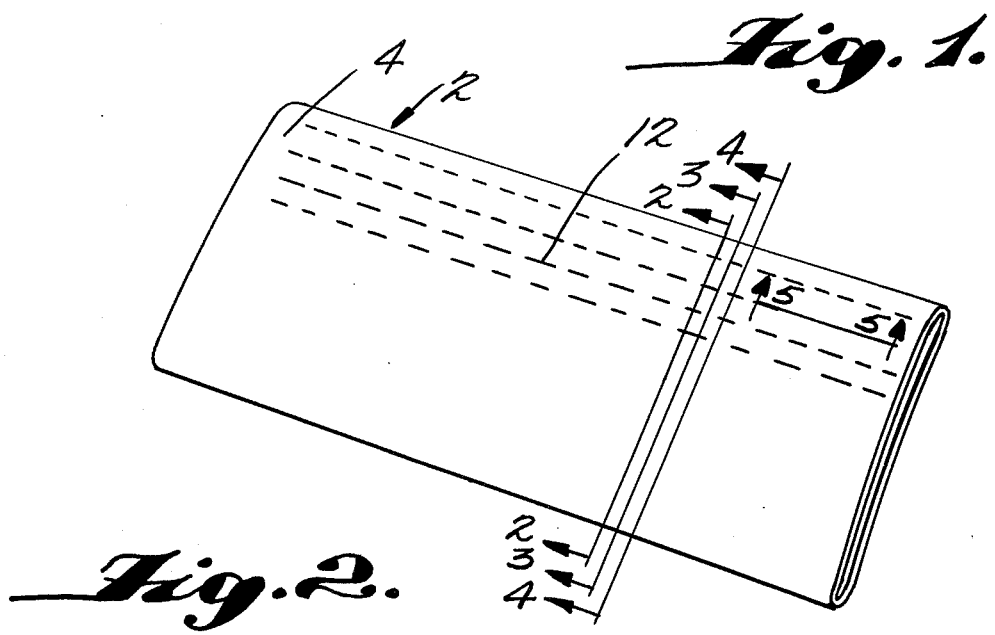
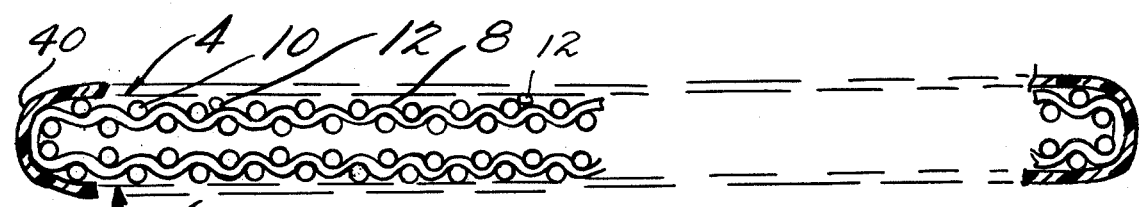
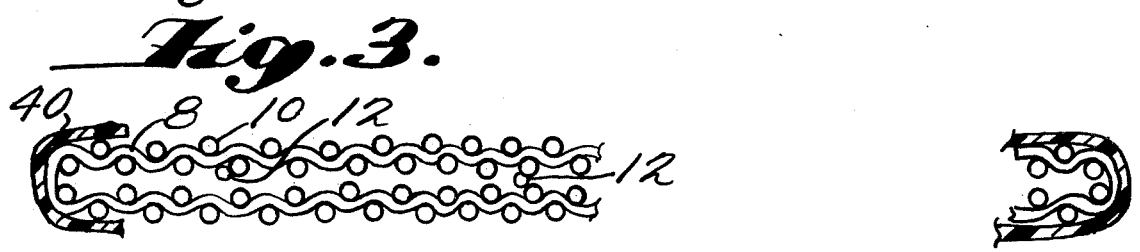
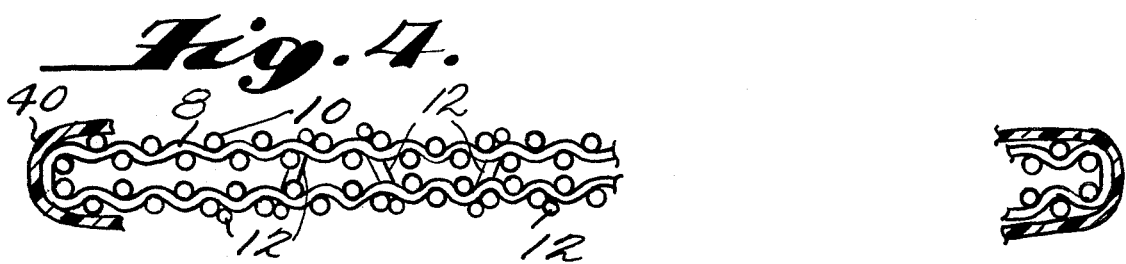
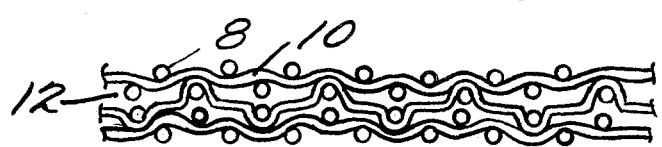

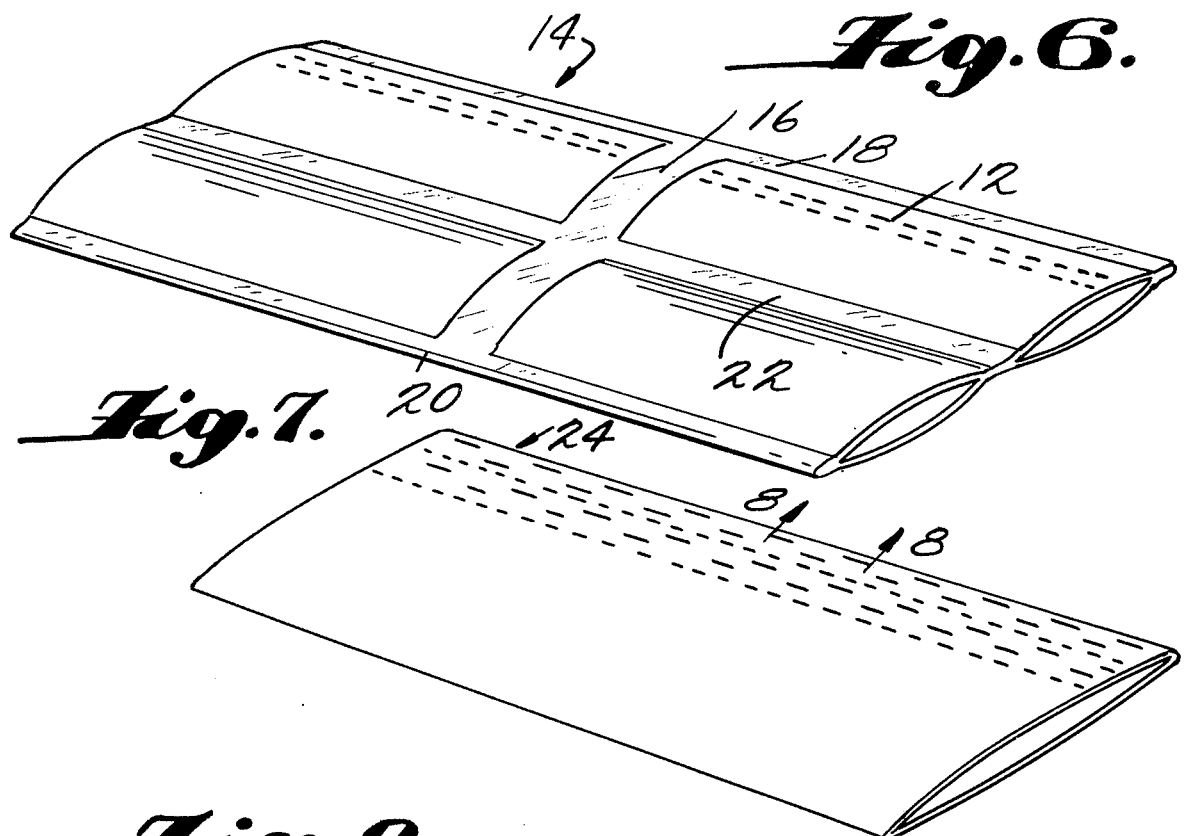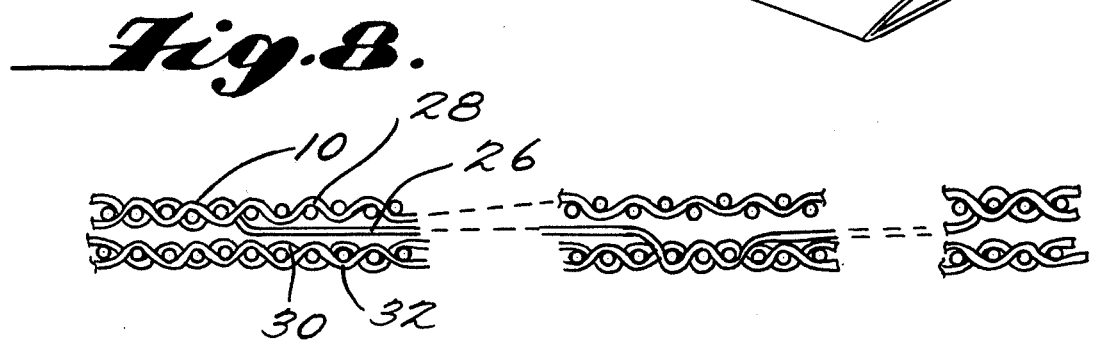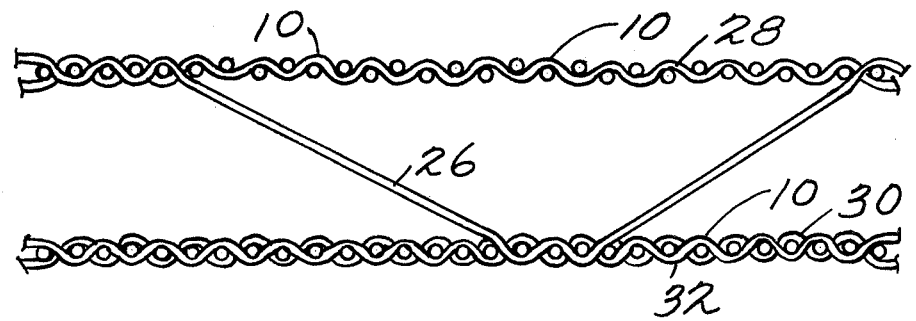

TUBULAR FABRIC COATED WITH PLASTICS OR SYNTHETIC RUBBERS

This is a continuation, of application Ser. No. 282,775 filed Aug. 22, 1972 now abandoned.

The invention relates to new flat woven tubular fabrics which can be easily coated with plastics or synthetic rubbers on both outside surfaces by normal coating methods and machines, and whose two layers may in part be connected closely or with distance fibers by means of weaving, so that coated hollow fabric articles of various shapes can be manufactured by a simple and very economical working method almost without or wholly without any stitching, welding or bonding operations. The ultimate shape of an article is predetermined by the weaving and coating technique.

Synthetic filament fabrics out of polyamides, polyethylene terephthalate or similar fibers are well known as basic fabrics for coating with plastics and/or synthetic rubbers. The coated goods are used for a number of technical applications such as, e.g., tarpaulins, air inflated halls and structures, conveyor belts, tubes, transport bags, etc. If the coated fabric material has to be manufactured into, e.g., tubes, bags, air hoses for the mining industry, boat hulls or other still more complicated polygonal forms it is necessary to connect the coated fabric webs and the parts cut out of them by stitching, sewing, welding, bonding or similar processes in several laborious operations. Forms of difficult shapes, in particular cause considerable trouble when forming corner welds, edges and adapting bottoms. It is almost impossible in such cases to achieve seam joints which at all points and in every direction have a shear strength near the tensile strength of the coated fabric material. The low peeling strength of welded seams does not allow any high mechanical strain in an opposite power direction.

The weaving of tubular fabric is also a well known and common process. When tubular goods are to be coated, they are cut along one edge of the flattened tube to obtain a web of double width or along both edges to obtain two fabric sheetings for the coating processes. It is also possible to cut tubular fabric in a diagonal (helical) direction, which results in one web of diagonal cloth. The single, plain rolls of fabric obtained by any of these methods can be coated with plastics or synthetic rubbers in the usual manner and manufactured into open or closed hollow forms by the methods described above.

It is also possible to connect parts of the two layers of a flat woven tubular fabric along one or both edges or in other places by weaving technique. Unfortunately however, flat-lying tubular fabric or tubular fabric with partial interlinkings between the two layers or interlinkings in certain places cannot be coated in the usual manner and on normal coating aggregates.

First, it is quite impossible to wind up flattened tubular fabrics smoothly enough and free of folds, because the unconnected zones which have to form the hollows after coating are free to move against each other. Longitudinal and transversal compressions and displacements occur between both sheetings and prevent normal coating by doctor knife, blanket coating, floating knife coating, calendering or similar methods. In front of transversal connections between the two layers air is included between the two sheetings, which leads to a blown-up cavity when heated. Further difficulties are experienced when rewinding the incompletely, defectively and non uniformly coated double fabric. To sum up, it is impossible to achieve smooth and uniform coating of flattened, double lying tubular fabric in this way.

The object of this invention is to remove the above disadvantages and provide means of coating tubular fabric by normal coating processes with plastics or synthetic rubbers smooth and uniform on both outside surfaces. For the final application of the thus coated tubular fabric web or the parts cut out of it, it is possible to predetermine the shape with one or more open or closed hollows by a very economical working method.

Surprisingly, it has now been found that both layers of the flat woven tubular fabric can be connected temporarily to each other by a weaving technique, so that all areas which for the end use need to be opened to form hollows are fastened closely together by auxiliary threads or filaments till the coating processes have been carried out. These auxiliary threads or filaments have a low tensile strength compared with the filaments or threads of the warp and weft or lose their tensile strength or the greater part of it as a result of subsequent measures during or after the coating processes.

The essential function of these auxiliary threads or filaments is to attach both layers of the flattened tubular fabric to each other to render possible an easy, smooth and uniform coating of both outside surfaces with synthetic rubbers or plastics. This new type of temporarily connected tubular fabric can easily be coated conventionally on normal machines with plastics or synthetic rubbers in the form of pastes, plastisoles, organosoles, solutions, dispersions or latex emulsions without folds, compressions or any loss in ease of handling compared with normal fabric backings. To weave this new type of tubular fabric at least two different types of yarn are needed; they can be subdivided by their nature and/or function into the following four classes of filaments and/or threads:

1. The basic fibers of the warp and the weft needed for the weave of the fabric.
2. Connecting fibers, coming out of the warp and/or weft, which by a special weaving technique permanently connect parts of the areas of the two layers of the flattened tubular fabric closely to each other.
3. Auxiliary threads or filaments of low tensile strength (very fine count of yarn and/or different kind of fiber from the basic fibers) which ensure the temporary close connection of the two layers.
4. Distance fibers, coming out of the warp and/or weft, which by a special weaving technique permanently link the total areas of the two layers or parts of these areas to determine the distance between the two layers for the final application.

On the basis of this invention and using the above mentioned fiber classes the following classes of flat woven tubular fabrics are possible:

A. Tubular fabric containing fibers of classes 1 and 3. In this case the auxiliary threads or filaments 3 must cover the total area of the fabric web to attach the two layers completely to each other closely and tightly.
B. Containing classes 1, 2 and 3. In this case the connecting fibers 2 permanently connect only parts of the two layers closely and tightly to each other (if the total areas of the two layers were linked by connecting fibers, the web would be a uniformly thick one-sheet fabric and the tubular character would cease to exist), while the auxiliary threads or filaments 3 must cover at least the areas without connecting fibers 2.

C. Containing classes 1, 3 and 4. In this case the auxiliary threads or filaments 3 must cover the total area of the tubular fabric web to attach temporarily the two layers closely to each other, while the distance fibers 4 can be over the whole area or only in parts of it or sporadically distributed in certain places just as necessitated by the shape required.

D. Containing classes 1, 2, 3 and 4. In this case the connecting fibers 2 permanently connect only parts of the two layers closely and tightly to each other, while the auxiliary threads or filaments 3 must cover at least the areas without connecting fibers. The distance fibers 4 can be over the areas free of connecting fibers 2 or only in parts or sporadically distributed in certain places of the areas without connecting fibers 2 just as necessitated by the shape designed.

The four classes A – D show that, on the basis of this invention, the auxiliary threads or filaments cover all those areas of the flat woven tubular fabrics which during or after the coating could be opened totally or to a certain predetermined distance between the two layers. The auxiliary threads or filaments are not necessary in places which are permanently and closely joined by connecting fibers because they cannot perform their function there, but it may be economical for weaving to have them incorporated over the total area.

Compared with all other fibers of the basic weave and all permanent connections between the two layers the auxiliary threads or filaments can originally have a very low tensile strength. The auxiliary threads may be fine count yarn of cotton or spun-rayon, eventually in minor quality of staple or spinning, and after performing their function in the coating processes they can be mechanically split or broken by being blown into the end use shapes by air or other gases or by filling the hollow articles with water or other liquids. The type of fiber of the auxiliary filaments may be of a very low specific strength to allow breaking under similar conditions.

It is also possible to use auxiliary threads or filaments which lose their tensile strength or the greater part of it by subsequent measures during or after the coating processes. These may be preferably threads or filaments out of synthetic fibers which, eventually at elevated temperatures, can be dissolved or swelled in water or other solvents or damaged by chemical reactions. Others may have a relatively low melting point or softening point and therefore lose their tensile strength partly or totally when heated. The auxiliary threads or filaments are best used in a thread count which is sufficient to fasten the two layers to each other well enough for smooth and trouble-free coating. This is the case when their number is very small in relation to the number of basic fibers of the warp and the weft. The best suited range of the thread count for the auxiliary threads or filaments for a satisfactory temporary connection of the whole area is between 1 for 2 inches and 2 for 1 inch, resulting a distance between two auxiliary threads or filaments of about 10 – 50 mm.

The auxiliary threads or filaments are to be employed over the entire width and length of the flat woven tubular fabric web if there are no connecting fibers used between the two layers. If connecting fibers join parts of the two layers to each other closely and tightly the auxiliary threads or filaments are to be employed at least over the entire width and length of all areas free of connecting fibers.

The auxiliary threads or filaments can be applied only in the warp or only in the weft or in both directions. It is also possible to use auxiliary threads and filaments of different kind in one tubular fabric web, e.g., one type in the warp and the other type in the weft. All types of auxiliary threads and filaments have a temporary function in the tubular fabric web which has been performed when smooth and uniform coating has been carried out on both outside surfaces.

The above mentioned connecting fibers and distance fibers have a permanent function in the tubular fabric web and, as they come out of the warp and/or weft, have the tensile strength of the basic fibers. It is also possible to use two or more sorts of basic fibers with different yarn diameters and/or fiber types, leading to different tensile strengths, in alternating or other sequence, and to use only the fibers of high tensile strength for the functions of connecting fibers and/or distance fibers. The difference in function between the connecting fibers and the distance fibers is the distance between the two layers of the flat woven tubular fabric which they determine for the final application. The connecting fibers join the two layers to each other only in certain parts of the total area or sporadically distributed but permanently, tightly and closely, while the distance fibers permanently connect the two layers over the total area or only in certain places or sporadically distributed but at a certain predetermined distance and define or narrow down the distance between the two layers for the end use. It is also possible to employ distance fibers in a way, that they result different lengths between the two layers to permit complicated, uneven shapes for the final application. The distance fibers — if present in the flat woven tubular fabric — after leaving the weave of one layer run between both layers until they enter the weave of the other layer. They stay in this position because both layers are temporarily stitched closely to each other by the auxiliary threads or filaments until coating is completed and the hollows of the end shapes are opened by breaking or damaging the auxiliary threads or filaments. After opening the distance fibers define the distances between the two layers in the end use shapes.

Preferably the basic fibers of the warp and weft and the connecting fibers and distance fibers originating in the basic weave are synthetic filaments or mainly synthetic filaments. These three classes of fibers need to have a high tensile strength as required for the final form of application. Therefore filaments of, e.g., polyamides, polyethylene terephthalates or polyvinylalcohols, etc., are favorably used.

The flat woven tubular fabrics, prepared according to this invention, can be easily coated conventionally on normal coating equipment with, e.g., PVC-plastisols, vinyl copolymers, polyurethanes, polyacrylates, polychlorobutadienes, polyolefines, polyamides, silicones, etc., by all techniques normally used for the respective polymers.

The new type of tubular fabric, described by this invention, allows to predetermine the end use shapes of hollow articles with one or more open or closed hollow spaces. The shapes can be formed by the distribution of the employed connecting fibers and/or distance fibers into predetermined patterns or recurring predetermined patterns. After coating both outside surfaces with plastics or synthetic rubbers the hollow articles may be filled with air, other gases, liquids, solids or cellular material.

As the shapes are predetermined by the described weaving measures of this invention, there is no or only a little further manufacturing needed to install and equip the hollow articles for the final applications. It may be necessary to insert loops, eyelets, openings for filling or injection, valves and valve connections, to cut edges, to fasten straps and latchets and to reinforce parts by additional stripes of normal coated fabric.

The hollow articles of various shapes, prepared by this invention, can be applied for manufacturing of tubes, cases, air hoses, e.g., for the mining industry, containers, various forms to be filled with cement or concrete, bags for ejecting from aircraft, boat hulls, pontoons, insulations, baffle-pillows, oil-stop barriers, air-filled mattresses, self supporting tents or parts of tents, air-inflated halls and structures and other industrial, sporting and camping equipment.

Practicing this invention with all possible combinations of the above described four classes of fibers enables a very economical production of series in various forms with a wide capability of shaping.

Additionally, this invention is explained by the description of three examples, although it is to be understood that they are given by way of illustration and not limitation.

The invention will be understood best in accordance with the drawings wherein:

FIG. 1 is a plan view of the flat tubular fabric of example 1, prior to coating with the plastisol;

FIG. 2 is a sectional view along the line 2—2 of FIG. 1, but also showing the coating;

FIG. 3 is a sectional view along the line 3—3 of FIG. 1;

FIG. 4 is a sectional view along the line 4—4 of FIG. 1;

FIG. 5 is a sectional view along the line 5—5 of FIG. 1;

FIG. 6 is a plan view of the flat tubular fabric of example 2 prior to coating the fabric;

FIG. 7 is a plan view of the flat tubular fabric of example 3 prior to coating the fabric;

FIG. 8 is a sectional view along the line 8—8 of FIG. 7; and

FIG. 9 is a view similar to FIG. 8 after coating the fabric, tearing up the auxiliary filaments and opening to the distance.

Referring more specifically to the drawings, wherein like numerals indicate like parts, in FIGS. 1-5 there is shown a flat tubular fabric 2 having an upper layer 4 and a lower layer 6 made up of weft fibers 8 and warp fibers 10. There are also provided auxiliary threads 12. The coating of plastisol is shown at 40.

In FIG. 6 the tubular fabric 14 is similar to the fabric 2 in FIG. 1 but it is provided with a woven stripe 16 which is 30 cm wide and connected permanently and closely in the transverse direction over the entire width at intervals of 20 meters. There are also provided two edge stripes 18 and 20 and a middle stripe 22 each of which is permanently connected.

As shown in FIGS. 7-9, a flat tubular fabric 24 similar to that in FIG. 1 is additionally connected permanently over its entire width and length by distance fibers 26. There are also provided upper warp fibers 28 and lower warp fibers 30 and 32.

EXAMPLE 1

A flat tubular fabric is woven in plain weave using basic fibers out of 1100 dtex polyethylene terephthalate. The setting is 10 filaments/cm in each direction of both layers. The weaving width of the double lapped flat tube is 160 cm. A temporary close connection between the two layers is effected by auxiliary cotton threads of 100 dtex which are installed in the warp direction over the entire width in a distance of 20 mm between each other. These cotton threads alternate between both layers crossing every fourth filament in the weft of each layer.

After weaving the rolled flat tubular fabric web is coated with PVC-plastisol (polyvinyl chloride-plastisol) on both outside surfaces in a normal way. 600 g/m$^2$ are applied in two coating steps upon each outside and jelled by heating. Filling with air breaks the auxiliary threads and forms an outside coated open tube, having a diameter of about 100 cm, which can be used, e.g., for air hoses in the mining industry.

EXAMPLE 2

A flat woven tubular fabric as described in example 1 is additionally connected permanently and closely along both edges and lengthways in the middle of the weaving width in three stripes of 10 cm diameter. At these areas basic fibers enter into the function of connecting fibers by a change of the weave which in these zones joins the two layers to each other. Every 20 m of woven length a stripe of 30 cm is connected permanently and closely in transversal direction over the entire width.

After coating on both outsides as described in example 1 and installing some valves and loops the sequence of hollow spaces formed on one side of the web is filled with water, the sequence of hollow spaces on the other side is filled with air. The so prepared "double-tube", arranged into 20 m segments by the transversal connections to improve better mobility, can be used as oil-stop barrier for cleaning rivers and coast regions.

EXAMPLE 3

A flat woven tubular fabric as described in example 1 is additionally connected permanently over its entire width and length by distance fibers in the type of the basic fibers. Every eighth filament in the warp direction of both layers alternates between the weaves of the two layers running between both layers each time for a length of 60 mm. After coating on both outsides as described in example 1 the material can be used for manufacturing of air inflated halls as a double-walled insulation material. Filling with air of higher pressure than inside the halls breaks the auxiliary threads and enables a predetermined permanent distance between the two layers limited by the distance fibers.

In these three examples only one type of basic fabric has been described, but it is to be understood that a wide variation in the fabric construction is permissible within the scope of this invention.

I claim:

1. In a flat, tubular fabric which is coated on both outside surfaces with a material that is substantially impervious to the passage of fluid therethrough, said flat fabric being woven in both the warp and weft directions with basic fibers to have two layers, said layers having, in the flat condition, side edges which are connected together so that said fabric is inflatable to include at least one hollow space, the improvement comprising said fabric including auxiliary threads, said auxiliary threads binding said two layers together in a close, tight woven formation extending over the total area of said fabric with the two layers fastened tightly and closely together to substantially temporarily prevent relative lateral movement between said two layers, said auxiliary threads having a tensile strength that is substantially lower than the tensile strength of said basic fibers so that, when said fabric is inflated to assume said tubular shape, said auxiliary threads will be broken.

2. The flat tubular fabric as claimed in claim 1 wherein said fabric comprises distance fibers woven into and extending between said two layers, said distance fibers permanently linking said two layers together at spaced apart points, said distance fibers determining the distance between said two layers when said two layers are separated by inflation of said tubular fabric.

3. A flat tubular fabric according to claim 1 wherein said auxiliary threads have said low tensile strength as a result of solvent treatment.

4. A flat tubular fabric according to claim 1 wherein said auxiliary threads are spaced at a distance of about 10–50 mm over the area of the fabric.

5. A flat tubular fabric according to claim 1 wherein the fabric comprises said basic fibers, connecting fibers permanently connecting predetermined parts of the areas of one of the two layers to the corresponding parts of the other of the two layers of the flat tubular fabric closely together.

6. A flat tubular fabric according to claim 2 also including other predetermined areas of the two layers which are permanently joined closely and tightly by connecting fibers.

7. A flat tubular fabric according to claim 1 wherein the basic fibers are at least mainly made of synthetic filaments.

8. A flat tubular fabric according to claim 1 wherein said auxiliary threads have said low tensile strength as a result of the application of heat applied thereto.

* * * * *